E. J. BRING.
DUMPING VEHICLE.
APPLICATION FILED JULY 31, 1911.
1,153,369.
Patented Sept. 14, 1915.
4 SHEETS—SHEET 1.
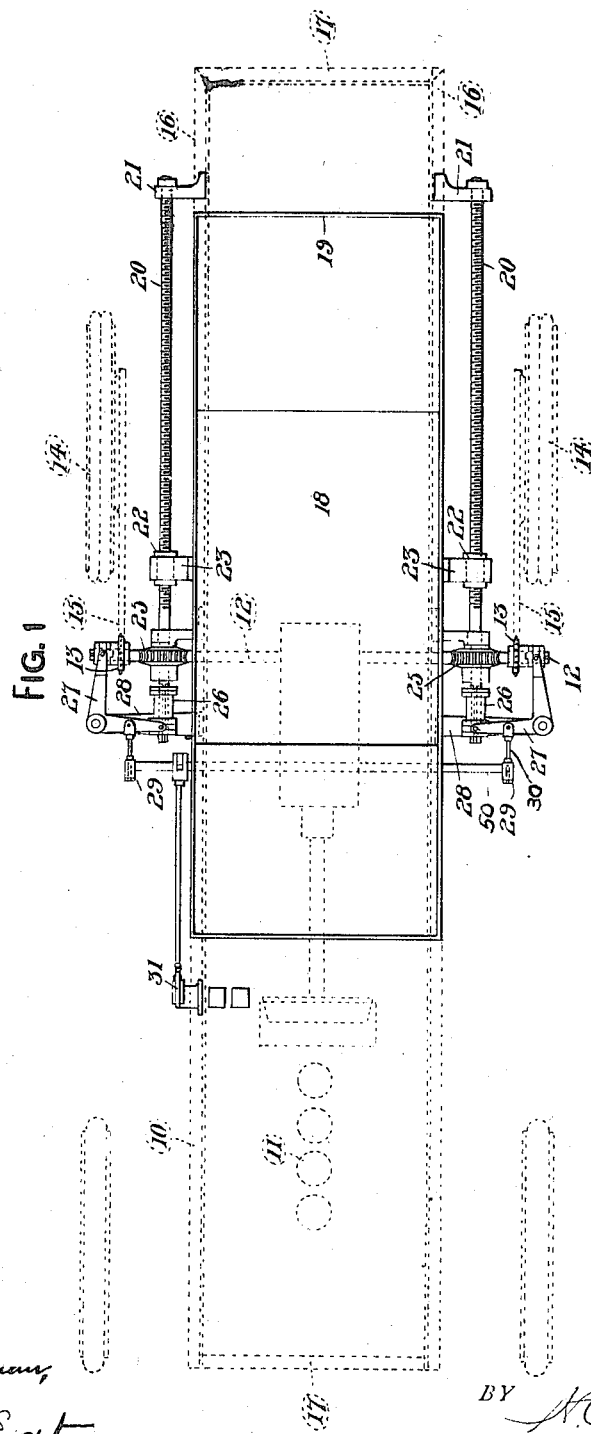
WITNESSES:
J. P. Appleman,
Ralph C. Evert.
INVENTOR.
E. J. Bring
BY
N. C. Evert & Co.
ATTORNEYS

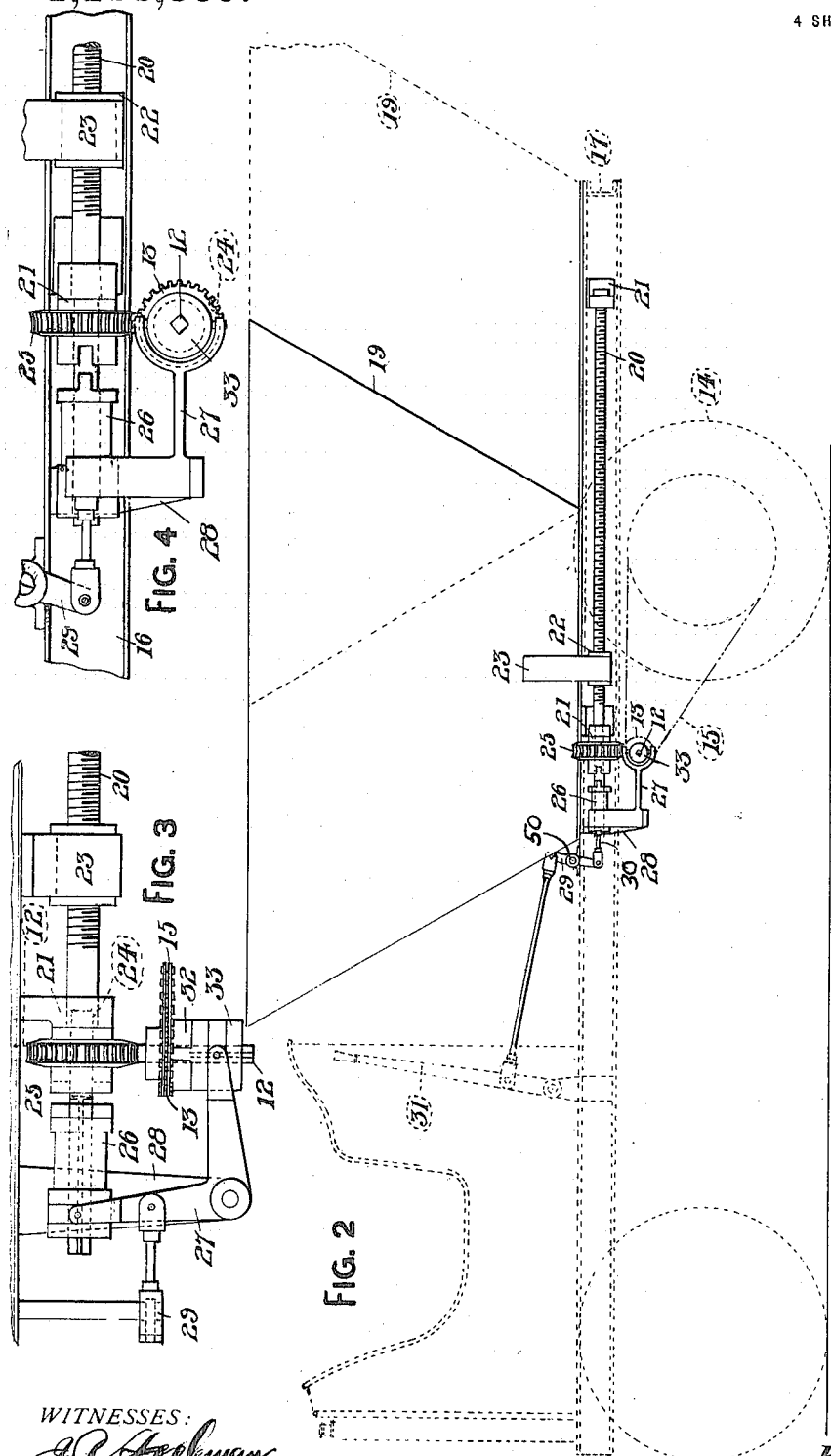

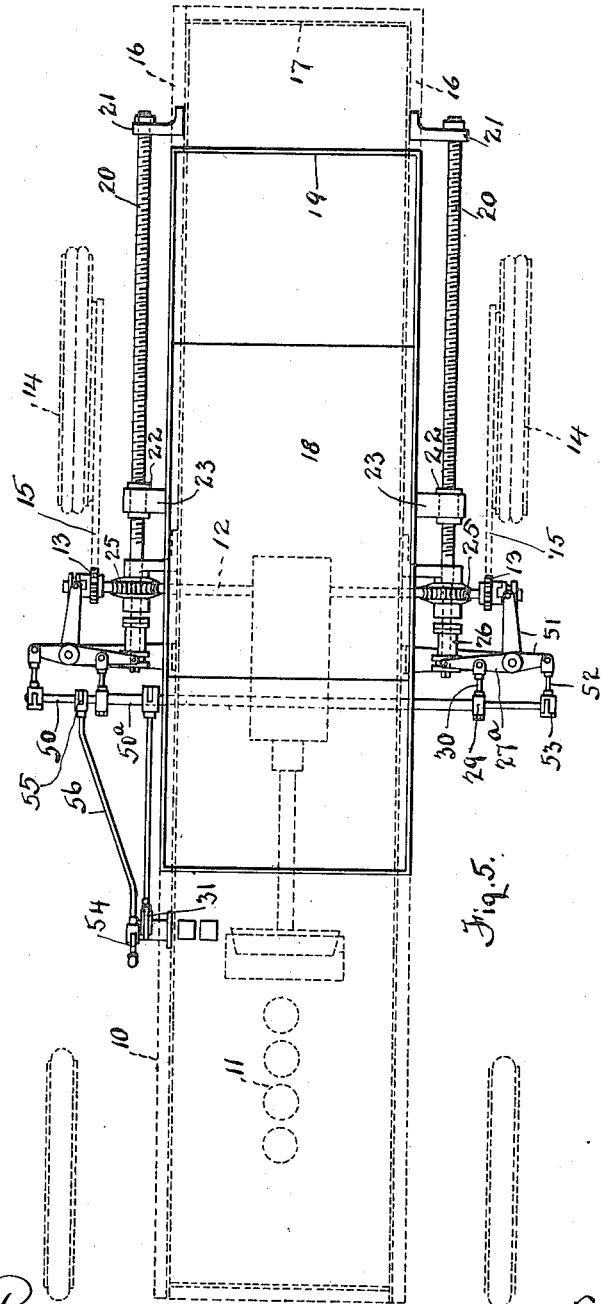

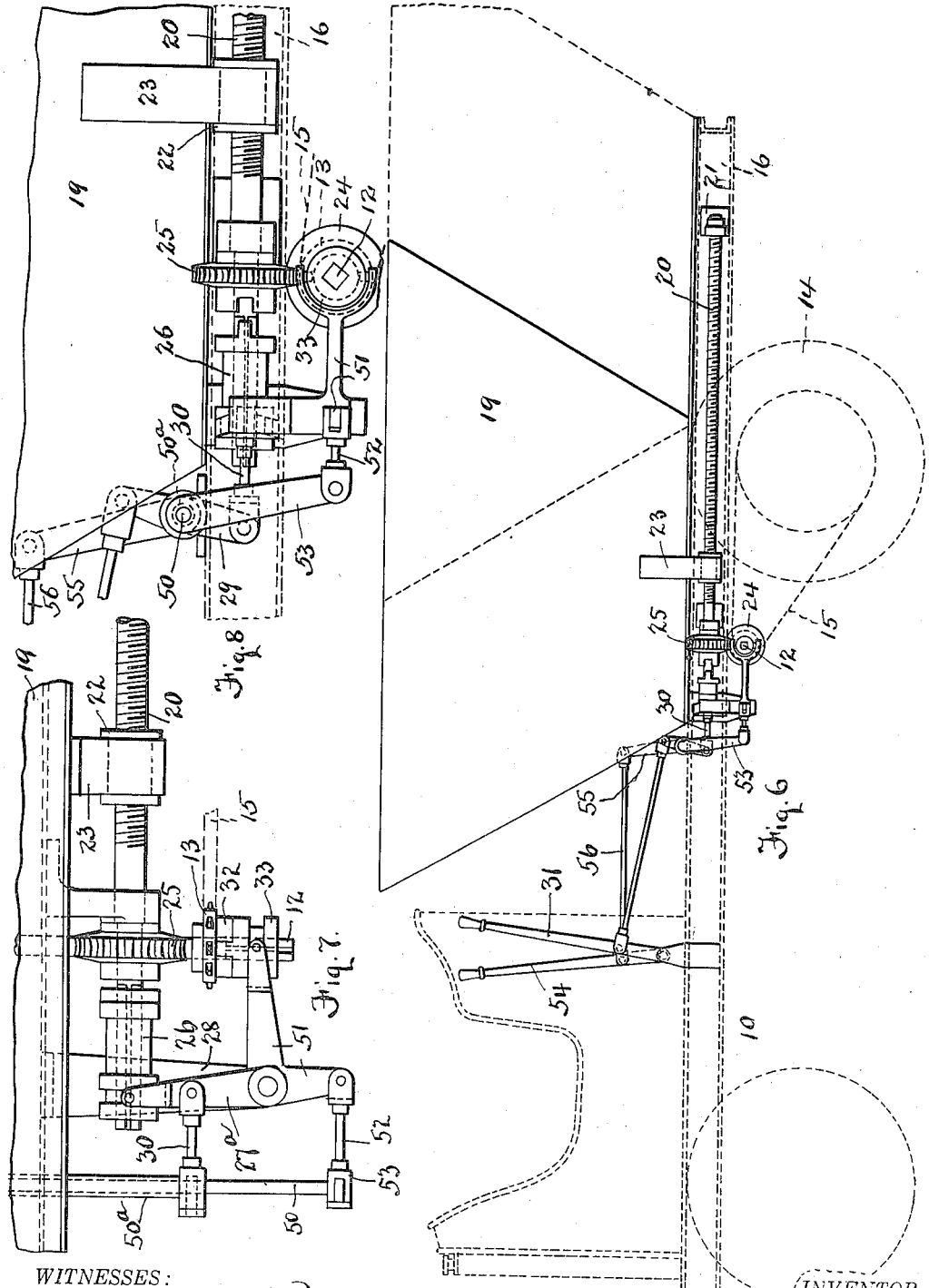

UNITED STATES PATENT OFFICE.

EINAR J. BRING, OF FRANKLIN, PENNSYLVANIA.

DUMPING-VEHICLE.

1,153,369.  Specification of Letters Patent.  Patented Sept. 14, 1915.

Application filed July 31, 1911. Serial No. 641,565.

*To all whom it may concern:*

Be it known that I, EINAR J. BRING, a citizen of the United States of America, residing at Franklin, in the county of Venango and State of Pennsylvania, have invented certain new and useful Improvements in Dumping-Vehicles, of which the following is a specification, reference being had therein to the accompanying drawing.

My invention relates to improvements in dumping vehicles, and has particular relation to devices of this character in which the dumping mechanism is operable by the power employed in propelling the vehicle.

Among the objects of my invention are: (1) To provide a motor vehicle with a commodity-carrier capable of dumping the commodity at will, the mechanism for providing the dumping operation being connected up to and adapted to be operated by the motive power for the vehicle. (2) To provide a motor vehicle having propelling mechanism driven by a motor, with a commodity-carrier adapted to have its contents dumped at will, the mechanism for providing the dumping operation being positioned in a manner to connect up with the propelling train in such manner that the manipulation of a lever or levers will permit a selection between the propelling of the vehicle and the dumping operation, or provide simultaneous operation of both functions. (3) To provide a dumping vehicle having a commodity-carrier normally positioned to retain the contents therein and movable in a substantially horizontal plane of the vehicle to permit dumping. (4) To provide a dumping vehicle with a commodity-carrier, the bottom of the carrier being stationary and the super-structure movable to carry it beyond the edge of the bottom to permit dumping of the contents. (5) To provide a dumping vehicle having its commodity-carrier movable longitudinally of the vehicle to carry the contents to a point where the contents will be free to pass outward. (6) To provide a device of this character having a motor mechanism for propelling the vehicle and also having a dumping mechanism, the control of each of said mechanisms being located at a substantially single point, whereby the operations may be provided without the operator leaving his seat.

Other objects are to provide a structure of this type capable of more extended use than that provided by the dumping wagons heretofore employed, to provide a structure which is neat and attractive in appearance, durable in construction, simple and efficient in operation, and which can be provided at a relatively low cost.

To these, and other ends, the nature of which will be readily understood as the invention is hereinafter disclosed, my invention consists in the improved construction and combination of parts hereinafter fully described, illustrated in the accompanying drawings, and particularly pointed out in the appended claims.

In the accompanying drawings, in which similar reference characters indicate similar parts in each of the views—Figure 1 is a plan view of a dumping vehicle of a preferred type, the dumping structure being disclosed in full lines, the vehicle portion being shown in dotted lines. Fig. 2 is a side elevation of the parts shown in Fig. 1. Fig. 3 is a plan view, on an enlarged scale, of a portion of the dumping mechanism. Fig. 4 is a side elevation of the part shown in Fig. 3. Fig. 5 is a view similar to Fig. 1, showing the connections employed in providing movements of the hopper either concurrently or non-concurrently with the movement of the vehicle. Fig. 6 is a side elevation of the parts shown in Fig. 5. Figs. 7 and 8 are plan and side elevational views respectively, on an enlarged scale, of a portion of the dumping mechanism shown in Fig. 5.

The present invention as disclosed in the drawings is that of a dumping mechanism which is carried by and forms part of a motor truck or vehicle, the structure embodying a particular way in which the contents of the commodity-carrier is dumped, and means whereby the operator for the motor vehicle may operate the dumping mechanism without leaving his seat.

In the drawings—10 designates the frame of a motor truck or vehicle having any preferred type of motor 11 adapted to drive a shaft (which may be the differential shaft or shafts) 12 extending transversely of the body of the vehicle and which carries the sprocket wheels 13 which act to drive the drive wheels 14 through sprocket chains 15, these parts being those usually employed in connection with motor trucks. It is to be understood, of course, that the usual controlling mechanism for the operator is provided, by means of which the power is applied at will, this particular construction not forming part of the invention.

In constructing the frame of the motor vehicle, I preferably provide suitable beams 16 or their equivalents, on opposite sides of the chassis, or which may form a part of the chassis, said beams preferably extending a suitable distance beyond the rear wheels (which generally form the drive wheels) and are connected together at their rear ends by a beam or bar 17.

Mounted in the frame and extending rearwardly to a point beyond but adjacent to a plane extending vertically through the axis of the wheels 14 is a bottom 18 which is fixedly secured in the chassis, said bottom 18 normally forming the bottom for the super-structure within which the contents are to be carried. The rear edge of the bottom terminates a considerable distance in advance of the bar or beam 17, thereby leaving an open space between said bottom edge and said beam 17, said space extending substantially the entire distance between the beams 16. The super-structure or hopper 19 is preferably formed of side and end walls, the end walls being inclined inwardly toward the bottom plane of the hopper, said hopper having the bottom of its side walls mounted on suitable runways formed on or provided by the tops of the beams 16. The hopper itself is preferably bottomless, the bottom 18 forming the bottom of the hopper when the latter is in carrying position, in which position, the lower edge of the rear inclined end of the hopper extends over the bottom 18. The normal or carrying position of the hopper is shown in Figs. 1 and 2 in which the main portion of the load is located in advance of the rear axle, thus retaining the weight of the load between the front and rear wheels, but having its weight located mainly on the rear wheels. The hopper is dumped by moving it rearwardly on the frame 10, thus carrying the open bottom of the hopper rearwardly beyond the rear edge of the bottom 18, thereby removing the support for the contents provided by the bottom 18 and permitting the contents to drop out of the hopper between the beams 16. As this takes place first at the rear of the hopper, it will be readily understood that while the hopper is movable rearwardly a distance to permit the front end of the hopper to discharge in rear of the bottom 18, the weight which is placed on the projecting portion of the beams is simply that of the hopper itself, the contents being discharged directly in rear of the bottom 18; this arrangement practically eliminates the placing of excessive weight on the rear of the truck such as might tend to overbalance the truck, and at the same time it provides for a dumping of the material at a point where it will not affect the movements of the wheels 14, all dumping taking place in rear of the wheels. Another advantage of this construction lies in the fact that there is no liability of a sticking of the material, the hopper, when in its rearmost position, being absolutely bottomless, and having the dumping operation provided by a gradually increasing opening at the rear of the hopper, making the truck equally as serviceable for use, for instance, with soft coal as with hard coal, it being readily understood that inasmuch as the side walls are substantially vertical, it is necessary only to provide an opening at the bottom large enough to permit the passage therethrough of the largest lumps of the coal. There are several ways in which the movements of the hopper can be provided, one form (a preferred form) being shown in the drawings, in which I make use of a threaded shaft 20 on each side of the vehicle, the shafts being mounted in bearings 21 secured to the beam 16, and said shafts having threaded collars or nuts 22 mounted in brackets 23 carried by the side of the hopper, it being readily understood that a rotation of the shafts 20 will cause the hopper to be moved longitudinally of the frame, the direction of movement depending upon the direction of motion of the shafts 20.

For the purpose of rotating the shafts 20 I employ the following mechanism: At suitable points on the shaft 12 I mount worms 24, said worms being adapted to mesh with worm gears 25 loosely mounted on the shafts 20, each of the gears 25 being adapted to be coupled at will to a complemental coupling member 26 keyed to the shaft 20 so as to permit a sliding movement of the members 26 on the shaft, but providing a positive drive to the shaft. Each member 26 is adapted to be moved longitudinally of the shaft by one arm of an elbow lever 27 pivotally mounted on a bracket 28, said arm being connected to a rocking lever 29 carried by the shaft 50 mounted on the frame, by means of a link 30, said lever 29 in turn being connected to an operating lever 31 positioned at a point convenient to the operator of the vehicle. By this construction, it will be seen that a rotation of the shaft 12 will cause the worm gears 25 to be driven, which gears, when the coupling member 26 is engaged therewith, cause the shaft 20 to be rotated, thus carrying the hopper along the frame 10, the direction depending upon the direction of movement of the shaft 20, this direction depending upon the direction of rotation of the shaft 12, the latter being determined by the usual controlling mechanism of the motor or transmission, as the case may be, I preferably having the parts arranged so that during the movement of the shaft 12 clockwise (the direction of rotation employed when the shaft is running in reverse direction), the shafts 20 will rotate in a direction to carry the hopper rearward, the forward movement of the hopper being then provided by simply reversing the direction of rotation of the shaft 12 and leaving this part of the mechanism ready to take up the forward direction of movement of the truck.

I preferably disconnect the propelling mechanism when operating the hopper moving mechanism, and for this purpose I preferably provide the shaft 12 with complemental coupling members 32 and 33, the latter being operated by the other arm of the lever 27, the arrangement being such that when the clutch members 26 are disengaged, the clutch members 32 and 33 are in engagement, thus providing for the driving of the vehicle, while a reversal of these connections through a shifting of the lever 27 will disengage the propelling mechanism and engage the hopper operating mechanism, it being understood that the sprocket wheels 13 are loosely mounted on the shaft 12, while the coupling members 33 are slidably mounted on said shaft but adapted to rotate therewith.

While I have shown the hopper as being moved by a pair of shafts 20, I desire it to be understood that this disclosure is mainly as an example, an alternative structure being to provide a single shaft preferably located approximately central of the space between the beams 16, the connection therewith being provided in a suitable manner so as to cause a rotation of the shaft to provide the movements to the hopper. Another alternative would be to employ suitable chain structures or an arrangement of bevel gears, these various forms being considered as equivalents of the construction shown, it being understood that the invention contemplates the employment of suitable means for moving the hopper longitudinally of the frame through power applied from the motor.

As will be readily understood, the hopper will remain in any position in which it may be placed, the thread and nut connection insuring against movement excepting by rotation of the shaft.

While I prefer to have the direction of movements of the shafts 20 provided in the manner heretofore stated, it will be understood that this is a matter of choice, and dependent upon the manner in which the gearing is arranged for providing the movements, and I do not restrict myself to either form.

In operation, with the hopper in its normal or front position and having its contents, the operator drives the vehicle through its propelling mechanism to the desired point, whereupon he releases the drive for the shaft 12, shifts the lever 31 to change the clutch connection between shaft 12 and the parts driven thereby, and then throws in his reversing mechanism by means of which the shaft 12 is rotated in reverse direction. This causes the shafts 20 to rotate in a direction to carry the hopper rearward. As soon as the rear end of the hopper passes the rear edge of the bottom 18, the contents will begin to drop, and the continued movement will gradually carry the hopper rearward until the hopper has entirely cleared the bottom 18, at which time the hopper is empty. The reversing mechanism is then shifted to change the direction of motion of shaft 12, whereupon the hopper will again be moved to its normal position, whereupon a shifting of the lever 31 will break the connection between shaft 12 and shafts 20 and restore the connection between shaft 12 and the sprocket wheels 13, thus causing the vehicle to move forward.

There are a number of advantages resulting from this construction, among which are to be found the fact that at no time is the weight of the contents carried rearward a distance sufficient to provide an overbalance of the parts; the rapidity of the dumping is not dependent upon the inclined walls of the hopper; the operator provides the entire operation while in his seat, there being no requirement of any manipulation of parts other than the lever control; the load is dumped at a point where the movement of the vehicle is unimpeded; the operating mechanism is of a character which is simple and efficient in operation, contains but a relatively few parts not liable to be broken under the strains, and which are durable; and the relative arrangement of parts is such as to permit of a maximum quantity of material being carried and dumped with ease and under absolute control.

While I have described the operation as causing a movement of the hopper longitudinally of the frame, it will be readily understood that by a slight change in the operating structure, the movements of the hopper may be in a direction laterally of the frame, and I desire it to be understood that the above description is to be considered as contemplating the movement of the hopper in any direction on a substantially horizontal plane, slight inclination in the direction of movement being considered as a horizontal plane, the purpose being to provide a dumping of the hopper by a movement of the latter in a substantially single plane, the movements automatically providing for the dumping. The invention also contemplates such slight changes as may be required to provide for a simultaneous operation of both the propelling mechanism and the dumping operation, the necessary changes to produce this result being slight and permitting the hopper to be dumped while the vehicle is being propelled, thus automatically distributing the material from the hopper in an obvious manner, the dumping operation being the same in each instance, the change being simply to provide for a propelling of the vehicle coincident with the movement of the hopper.

The changes necessary to provide for a propelling of the vehicle coincident with the dumping operation are shown in Figs. 5 to 8, the principal difference being in segregating the operation of the clutch members 32 and 33 from the operation of the clutch connections with worm gear 25. In the construction of Figs. 1 to 4 inclusive, these clutching operations take place simultaneously through the use of the elbow lever 27, thereby making it impossible to provide a concurrent movement of the parts, the clutch mechanism for the worm gear 25 being positively connected to the mechanism which provides the traction movements to the vehicle. In the construction shown in Figs. 5 to 8 inclusive, these clutching operations and the structures for providing them are disconnected, and the changes necessary to provide this are the following:—The elbow lever 27 is replaced by two levers indicated respectively at 27ª and 51, the former operating the clutch mechanism for gear 25, while the latter actuates the clutch member 33. To operate these levers, I preferably mount a sleeve 50ª upon the shaft 50, the shaft 50 carrying the arms 53 which, through the connections 52 provide the movements to the clutch member 33, the sleeve 50ª carrying the arms 29 which, through the connections 30 actuate the coupling member 26. Two operating levers 31 and 54 are employed, the former being connected to the sleeve 50ª and the latter to the shaft 50 through connection 56 and arm 55. By this arrangement either of the clutch mechanisms can be brought into operation at will or both can operate at the same time. In this form, the threading of the shafts 20 is so arranged as to feed the nuts 22 rearwardly as the vehicle moves forwardly. As will be readily understood the unloading can take place either while the vehicle is stationary or moving forwardly; for the stationary dumping, the lever 54 is moved to unclutch the traction drive and the lever 31 thrown to couple up the shaft 20 to the gear 25; when the moving dumping operation is to take place, both levers are in operative position. As will be readily understood, the vehicle should preferably remain stationary when returning the hopper to position, as the motor is then driving the shaft 12 in reverse direction.

While I have herein disclosed one embodiment of my invention, I do not limit myself to the specific details of construction set forth, reserving the right to make any and all such modifications and changes therein as may be found desirable or essential in use, so long as such changes and modifications may fall within the spirit and scope of the invention as set forth in the accompanying claims.

Having thus described my invention, what I claim as new is:—

1. In a dumping vehicle, a bottomless hopper, a frame on which said hopper is supported, said frame having a stationary element adapted to form a bottom for the hopper when the latter is in commodity-carrying position, and means for moving the hopper relatively to said element in the direction of length of the frame and in a plane substantially parallel to the frame to gradually remove the commodity-support afforded by the bottom, said means acting to prevent movement of the hopper out of such plane, said frame projecting beyond the rear of the element to form a support for the hopper when in commodity-discharge position.

2. In a dumping vehicle, a bottomless hopper, a wheel frame on which said hopper is supported, said frame having a stationary element adapted to form a bottom for the hopper when the latter is in commodity-carrying position, said element extending to a point in rear of and adjacent to a plane extending vertically through the axis of the rear wheels, and means for moving said hopper rearwardly in a plane substantially parallel to the frame to gradually carry it beyond the rear end of said bottom to gradually remove the commodity-support afforded by the bottom, said frame projecting beyond the rear of the element to form a support for the hopper when in commodity-discharge position, whereby the commodity discharge will be in rear of said wheel axis and within the travel path of the vehicle.

3. The combination with a motor vehicle having a motor, drive wheels, and connections between the motor and wheels to provide movement to the vehicle at will, of a fixed frame on and extending in the direction of length of the vehicle, a bottomless hopper mounted on and movable in the direction of length of said frame and solely in a plane parallel to the frame, said frame having an element adapted to form a bottom for the hopper when the latter is in its commodity-carrying position, and means for operatively engaging said hopper and said connections at will to provide said movements to the hopper, said movements providing an automatic dumping of the hopper within the travel path of the vehicle.

4. The combination with a motor vehicle having a motor, drive wheels, and drive connections between the motor and said wheels to provide movement to the vehicle at will, of a fixed frame on and extending in the direction of length of the vehicle, a bottomless hopper mounted on and movable in the direction of length of said frame and solely in a plane parallel to the frame, said frame having an element adapted to form a bottom for the hopper when the latter is in its commodity-carrying position, and means for operatively engaging said hopper and said connections at will to provide said movements to the hopper, said movements providing an automatic dumping of the hopper within the travel path of the vehicle, the movements of the hopper and of the drive wheels being either concurrent or non-concurrent at will.

In testimony whereof I affix my signature in the presence of two witnesses.

EINAR J. BRING.

Witnesses:
 W. L. SCRIBNER,
 C. A. CATHCART.